United States Patent
Rossi et al.

(10) Patent No.: US 8,745,343 B2
(45) Date of Patent: Jun. 3, 2014

(54) DATA DUPLICATION RESYNCHRONIZATION WITH REDUCED TIME AND PROCESSING REQUIREMENTS

(75) Inventors: Robert P. Rossi, Altamonte Springs, FL (US); Johan Olstenius, Bangkok (TH)

(73) Assignee: Xyratex Technology Limited, Havant (GB)

( * ) Notice: Subject to any disclaimer, the term of this patent is extended or adjusted under 35 U.S.C. 154(b) by 686 days.

(21) Appl. No.: 12/763,661

(22) Filed: Apr. 20, 2010

(65) Prior Publication Data
US 2011/0258381 A1 Oct. 20, 2011

(51) Int. Cl.
G06F 12/16 (2006.01)
G06F 11/14 (2006.01)
G06F 11/20 (2006.01)

(52) U.S. Cl.
CPC ........ G06F 11/1446 (2013.01); G06F 11/2082 (2013.01); G06F 11/2058 (2013.01)
USPC ..... 711/162; 711/167; 711/170; 711/E12.103

(58) Field of Classification Search
CPC ............ G06F 11/2058; G06F 11/2082; G06F 11/1658; G06F 11/1446
USPC .......... 711/162, 170, 165, E12.001, E12.103; 707/649, 655, 658, 646
See application file for complete search history.

(56) References Cited

U.S. PATENT DOCUMENTS

| | | | | |
|---|---|---|---|---|
| 5,487,160 A * | 1/1996 | Bemis | ........................... | 711/162 |
| 7,069,402 B2 * | 6/2006 | Coulter et al. | ................ | 711/162 |
| 7,100,089 B1 * | 8/2006 | Phelps | ........................... | 711/162 |
| 7,143,249 B2 * | 11/2006 | Strange et al. | ................ | 711/162 |
| 7,373,472 B2 * | 5/2008 | Bhasin et al. | ................. | 711/162 |
| 7,467,268 B2 * | 12/2008 | Lindemann et al. | .......... | 711/162 |
| 7,865,475 B1 * | 1/2011 | Yadav et al. | ................... | 707/655 |
| 7,941,501 B2 * | 5/2011 | McCabe et al. | ................ | 711/161 |
| 2006/0150001 A1 * | 7/2006 | Eguchi et al. | ...................... | 714/6 |
| 2009/0259817 A1 * | 10/2009 | Sharma et al. | ................. | 711/162 |
| 2010/0299309 A1 * | 11/2010 | Maki et al. | ...................... | 711/162 |

OTHER PUBLICATIONS

Patterson, et al., "A Case for Redundant Arrays of Inexpensive Disks (RAID)", Association for Computing Machinery (ACM), 1988, pp. 109-116.

* cited by examiner

*Primary Examiner* — Pierre-Michel Bataille
(74) *Attorney, Agent, or Firm* — Pillsbury Winthrop Shaw Pittman LLP

(57) ABSTRACT

There is provided a method of resynchronising a previous duplication, started at a first time, of a source logical drive on a destination logical drive. The method comprises tracking changes to the data on said source logical drive since said first time and starting a resynchronisation operation at a second time later than said first time. The resynchronisation operation comprises copying data from said source logical drive to said destination logical drive by copying only data which has changed since said first time. By providing such a method, the need to copy data which has not changed since the previous duplication operation is alleviated. This reduces the time and processing required to perform the resynchronisation operation by eliminating unnecessary transfer of data which has not changed since the earlier duplication.

4 Claims, 10 Drawing Sheets

DATA DUPLICATION RESYNCHRONIZATION WITH REDUCED TIME AND PROCESSING REQUIREMENTS

The present invention relates to a method of, and apparatus for, re-synchronising a duplication of a logical drive.

There are a number of possible architectures for storage systems such as data stores in networked computer systems. These systems often feature a large number of storage devices such as hard disks which are networked together. One arrangement of disk drives is known as a redundant array of inexpensive disk (RAID). RAID arrays are the primary storage architecture for large, networked computer storage systems. The RAID architecture was first disclosed in "A Case for Redundant Arrays of Inexpensive Disks (RAID)", Patterson, Gibson, and Katz (University of California, Berkeley). RAID architecture combines multiple small, inexpensive disk drives into an array of disk drives that yields performance exceeding that of a single large drive.

There are a number of different RAID architectures, designated as RAID-1 through RAID-6. RAID architecture provides data redundancy in two basic forms: mirroring (RAID 1) and parity (RAID 3, 4, 5 and 6). The implementation of mirroring in RAID 1 architectures involves creating an identical image of the data on a primary disk on a secondary disk. Mirroring enables a system to maintain automatically one or more copies of data so that, in the event of a disk hardware failure, a system can quickly recover lost data. Mirroring may be performed locally or remotely as part of a disaster recovery process, or both.

RAID 3, 4, 5, or 6 architectures generally utilise three or more disks of identical capacity. In these architectures, two or more of the disks are utilised for reading/writing of data and one of the disks stores parity data. Data interleaving across the disks is usually in the form of data "striping" in which the data to be stored is broken down into blocks called "stripe units". The "stripe units" are then distributed across the disks. Therefore, should one of the disks in a RAID group fail or become corrupted, the missing data can be recreated from the data on the other disks.

A RAID array is usually presented to the host user as one or more logical drives. A logical drive is a usable region of storage capacity located on one or more physical disk drive components in a computer system. The drive is referred to as logical (or, sometimes, virtual) because it does not actually form a physical entity in its own right, and may comprise, for example, a partition on one or more disks in a RAID array.

In most modern storage networks, a number of storage devices are connected to many host server devices in a storage network. A single RAID array may provide to capacity to one or more servers. In this case, logical drives are used to partition the available capacity and provide the amount of storage needed by each host from a common pool of logical drives.

Many modern disk controllers implement a feature known as logical drive duplication. This enables a user to generate an identical copy of a logical drive for backup or reference purposes. The copy of the logical drive resides on another physical storage area of the disk array, or on an entirely different disk array.

The time taken to perform a logical drive duplication operation will depend upon the size of the logical drive to be duplicated. In the case of a large logical drive, the time taken may be significant. The performance and availability of a system can be greatly hindered when a logical drive must be taken offline to perform a duplication operation.

Instead of taking a logical drive offline, an alternative is to disable temporarily write access to data during the duplication, either by stopping the accessing applications or by using a locking application provided by the operating system to enforce exclusive read access.

The above arrangements may be acceptable for low-demand systems or non-time critical environments such as, for example, desktop computers or small workgroup servers. However, high-demand systems or critical-access systems such as storage area networks cannot afford to be inoperative for such time periods.

A known solution is to use a snapshot engine. A snapshot is a copy of a data set of the source logical drive which is frozen at a point in time. This data is stored on a snapshot logical drive. When a snapshot is first created, only meta-data relating to the configuration in which the source data is stored on the source logical drive is obtained and stored on the snapshot logical drive. Since there is no actual copying of data from the source logical drive to the snapshot logical drive, the creation of the snapshot image is extremely fast and almost instantaneous.

The snapshot image then monitors and tracks any writes to logical blocks on the source logical drive. If a write is requested to a particular logical block of data, the original data is copied onto the snapshot logical drive before the write is allowed to the logical block. This is known as a "copy-on-write". This maintains on the snapshot logical drive a consistent image of the source logical drive at the exact time the snapshot was taken.

For a read request to a logical block on the source logical drive, it is first determined whether the logical block of data has been modified by having been written to. If the logical block of data has not been written to, then the read request is directed to the source logical drive. However, if the read request is directed to a logical block of data which has been written to since the snapshot was taken, then the read request is directed to the copied logical block stored on the snapshot logical drive.

Therefore, snapshots enable source data protection during duplications and allows for continued normal host access of the source logical drive being duplicated. This, therefore, preserves a self-consistent past image of the logical drive. The snapshot image contains the meta-data describing the logical blocks of data that have changed since the snapshot was first created, together with a copy of the original data of those logical blocks when the first write request to the logical blocks are received. The duplication engine uses the snapshot data as a source logical drive for copying data which has changed onto the destination logical drive.

An alternative method of using a snapshot engine during duplications is to use the data directly from the source logical drive, bypassing the snapshot logical drive. This may result in the destination logical drive comprising temporary corruptions due to writes occurring on the source logical drive during the duplication process. However, this temporary corruption is corrected by performing a "snapback".

A snapback describes the process whereby the newly duplicated (destination) logical drive is updated with data sourced from the snapshot logical drive. This will update only the data blocks which were modified (e.g. written to) during the duplication process, because the snapshot contains only this data. Once the snapback process is complete, the duplicated logical drive is freed from temporary corruption and contains an identical copy of the data on the source logical drive.

Once a duplication operation has completed, then writes are once again allowed to the source logical drive and normal usage of the source logical drive continues. At some time later (which may be anything from a few hours to a period of weeks or months), it will become necessary to perform another duplication operation to duplicate the data stored on the source logical drive. This is to ensure that the data written to the source logical drive since the duplication operation is backed up to provide redundancy should the source logical drive become corrupted or the data thereon lost.

A known approach to this is to perform a further complete duplication operation as described above. This will resynchronise the data on the destination logical drive so that the data on the destination logical drive is an exact copy of the data on the source logical drive at the time the further duplication operation is initiated.

However, a disadvantage of this approach is that all of the data on the destination logical drive is overwritten. Depending upon the amount of data that has changed in the time interval between the earlier duplication and the later one, not all of the data may have been changed. Therefore, in many cases, the further duplication operation is overwriting data with the same, unchanged data.

Therefore, known destination logical drive resynchronisation methods and arrangements suffer from a technical problem that the resynchronisation process requires a further complete duplication operation to copy all of the data on the source logical drive, irrespective of whether the data has been changed since the last duplication operation. By copying all of the data from the source logical drive to the destination logical drive, data on the destination logical chive may potentially be overwritten by identical data. This is wasteful of system resources and unnecessarily increases the time required to resynchronise the destination logical drive to the source logical drive.

According to a first aspect of the present invention, there is provided a method of resynchronising a previous duplication, started at a first time, of a source logical drive on a destination logical drive, the method comprising: tracking changes to the data on said source logical drive since said first time; and starting a resynchronisation operation at a second time later than said first time; said resynchronisation operation comprising: copying data from said source logical drive to said destination logical drive, wherein said copying comprises copying only data which has changed since said first time.

By providing such a method, the need to copy data which has not changed since the previous duplication operation is alleviated. This reduces the time and processing required performing the resynchronisation operation by eliminating unnecessary transfer of data which has not changed since the earlier duplication.

In one embodiment, the step of tracking changes comprises storing, in a data storage area, metadata relating to said changed data.

In one embodiment, said step of tracking changes comprises utilising a first snapshot created at said first time, said first snapshot comprising said metadata relating to said changed data. In a variation, said data storage area comprises a snapshot logical drive.

Conventionally, snapshots are used to track data which has changed during a duplication operation. However, the inventors of the present application have realised that this approach can be used to monitor all of the changes on the source logical drive since the start of the previous duplication operation.

In a variation, said first snapshot comprises only metadata. To store all of the data which has changed as copy on write data would be prohibitive in terms of the storage space required. By storing only metadata relating to the data which has changed since the first time, the storage capacity required for the snapshot will be relatively small.

In an alternative variation, wherein said first snapshot comprises only metadata relating to changes subsequent to said previous duplication operation.

In one embodiment, the method further comprises, prior to said step of tracking, converting said first snapshot image such that said first snapshot image records only metadata relating to any writes to said source logical drive subsequent to completion of said previous duplication. This approach enables a "conventional" snapshot to be used during a duplication operation. Then, after the duplication operation has completed, the snapshot can be used to track the changes occurring on the source logical drive by recording metadata relating to data which has changed since said first time.

In another embodiment, said resynchronisation operation further comprises, prior to said copying, creating a second snapshot of said source logical drive at said second time. The resynchronisation operation is configured to resynchronise the destination logical drive back to an identical copy of the source logical drive at the second time. Therefore, a second snapshot can be employed to enable write requests to the source logical drive to continue (i.e. copy on write) during the resynchronisation process.

In one variation, said copying utilises said second snapshot such that only data which has changed in between said first and second times is copied to said destination logical drive. The second snapshot can be used to provide a picture of the source logical drive at the second time, irrespective of any writes which may have occurred on the source logical drive after the second time.

In another variation, the method further comprises, subsequent to said resynchronisation operation, tracking data on said source logical drive which has changed since said second time. This process enables changes after the second time to be tracked so that a later resynchronisation operation can be carried out.

In a further variation, said tracking utilises said second snapshot.

In one example, the method further comprises, prior to said tracking of data since said second time, converting said second snapshot such that said second snapshot records only metadata relating to any writes to said source logical drive subsequent to completion of said resynchronisation operation.

According to a second aspect of the present invention, there is provided a method of resynchronising a previous duplication, started at a first time, of a source logical drive on a destination logical drive, the method comprising: providing a first snapshot taken at said first time; subsequent to said previous duplication, converting said first snapshot such that said first snapshot records only metadata relating to any writes to said source logical drive subsequent to completion of said previous duplication; tracking changes made to the data on said source logical drive since said first time using said converted first snapshot; starting a resynchronisation duplication operation at a second time later than said first time; creating a second snapshot at said second time; and utilising said first and second snapshots, copying only data which has changed in between said first and second times from said source logical drive to said destination logical drive.

According to a third aspect of the present invention, there is provided a method of resynchronising a previous duplication, started at a first time, of a source logical drive on a destination logical drive, the method comprising: providing first and second snapshots taken at said first time, said first snapshot comprising data and metadata relating to data which has changed since said first time and said second snapshot comprising only metadata relating to data which has changed since said first time; subsequent to said previous duplication, deleting said first snapshot; tracking, using said second snapshot, changes made to the data on said source logical drive since said first time; starting a resynchronisation operation at a second time later than said first time; creating a third snapshot at said second time, said third snapshot being arranged to comprise data and metadata relating to data which has changed since said second time; utilising said second and third snapshots, copying only data which has changed in between said first and second times from said source logical drive to said destination logical drive.

In one example, the method further comprises creating a fourth snapshot at said second time, said fourth snapshot being arranged to comprise only metadata relating to data which has changed since said second time.

According to a fourth aspect of the present invention, there is provided apparatus for resynchronising a previous duplication, started at a first time, of a source logical drive on a destination logical drive, the apparatus comprising: a controller operable to track changes to the data on said source logical drive since said first time; and to start a resynchronisation operation at a second time later than said first time; the controller being further operable to: perform said resynchronisation operation by copying data from said source logical drive to said destination logical drive, said controller being operable to copy only data which has changed since said first time.

In one example, the apparatus is further operable to store, in a data storage area, metadata relating to said changed data.

In one example, the apparatus is further operable to utilise a first snapshot created at said first time, said first snapshot comprising said metadata relating to said changed data. In a variation, said data storage area comprises a snapshot logical drive.

In one variation, said first snapshot comprises only metadata.

In another variation, said first snapshot comprises only metadata relating to changes subsequent to said previous duplication operation.

In one embodiment, the apparatus is further operable, prior to said step of tracking, to convert said first snapshot image such that said first snapshot image records only metadata relating to any writes to said source logical drive subsequent to completion of said previous duplication.

In an example, the apparatus is further operable, prior to said copying, to create a second snapshot of said source logical drive at said second time.

In another example, the apparatus is further operable to utilise said second snapshot such that only data which has changed in between said first and second times is copied to said destination logical drive.

In a variation, the apparatus is further operable, subsequent to said resynchronisation operation, to track data on said source logical drive which has changed since said second time.

In one example, the apparatus is further operable to utilises said second snapshot to track data on said source logical drive which has changed since said second time.

In another example, the apparatus is further operable, prior to said tracking of data since said second time, to convert said second snapshot such that said second snapshot records only metadata relating to any writes to said source logical drive subsequent to completion of said resynchronisation operation.

According to a fifth aspect of the invention, there is provided apparatus for resynchronising a previous duplication, started at a first time, of a source logical drive on a destination logical drive, the apparatus comprising a controller operable: to provide a first snapshot taken at said first time; to convert, subsequent to said previous duplication, said first snapshot such that said first snapshot records only metadata relating to any writes to said source logical drive subsequent to completion of said previous duplication; to track changes made to the data on said source logical drive since said first time using said converted first snapshot; to start a resynchronisation duplication operation at a second time later than said first time; to create a second snapshot at said second time; and to copy, utilising said first and second snapshots, only data which has changed in between said first and second times from said source logical drive to said destination logical drive.

According to a sixth aspect of the invention, there is provided apparatus for resynchronising a previous duplication, started at a first time, of a source logical drive on a destination logical drive, the apparatus comprising a controller operable: to provide first and second snapshots taken at said first time, said first snapshot comprising data and metadata relating to data which has changed since said first time and said second snapshot comprising only metadata relating to data which has changed since said first time; to delete, subsequent to said previous duplication, said first snapshot; to track, using said second snapshot, changes made to the data on said source logical drive since said first time; to start a resynchronisation operation at a second time later than said first time; to create a third snapshot at said second time, said third snapshot being arranged to comprise data and metadata relating to data which has changed since said second time; to utilise said second and third snapshots in order to copy, from said source logical drive to said destination logical drive, only data which has changed in between said first and second times.

By providing such an arrangement, the need to overwrite copied data during the resynchronisation of the duplication process is removed. This reduces the time and processing required to perform the duplication operation by eliminating unnecessary data transfers.

In one arrangement, the apparatus is further operable to create a fourth snapshot at said second time, said fourth snapshot being arranged to comprise only metadata relating to data which has changed since said second time.

The inventors have identified an advantage in skipping the transfer of data from the source logical drive to the destination logical drive which has not been changed since the initial duplication operation was carried out.

In one example, the apparatus is in the form of a RAID controller.

In a variation, the RAID controller comprises firmware, software or a combination of both on a host.

In an alternative variation, the RAID controller comprises firmware, software or a combination of both in an off-host controller.

According to a seventh aspect of the present invention, there is provided a networked data resource comprising at least one physical disk and the RAID controller of the second aspect of the invention.

According to an eighth aspect of the present invention, there is provided a computer program product executable by a programmable processing apparatus, comprising one or more software portions for performing the steps of the first aspect of the present invention.

According to a ninth aspect of the present invention, there is provided a computer usable storage medium having a computer program product according to the fourth aspect of the present invention thereon.

Embodiments of the present invention will now be described in detail with reference to the accompanying drawings, in which.

Figure 1:
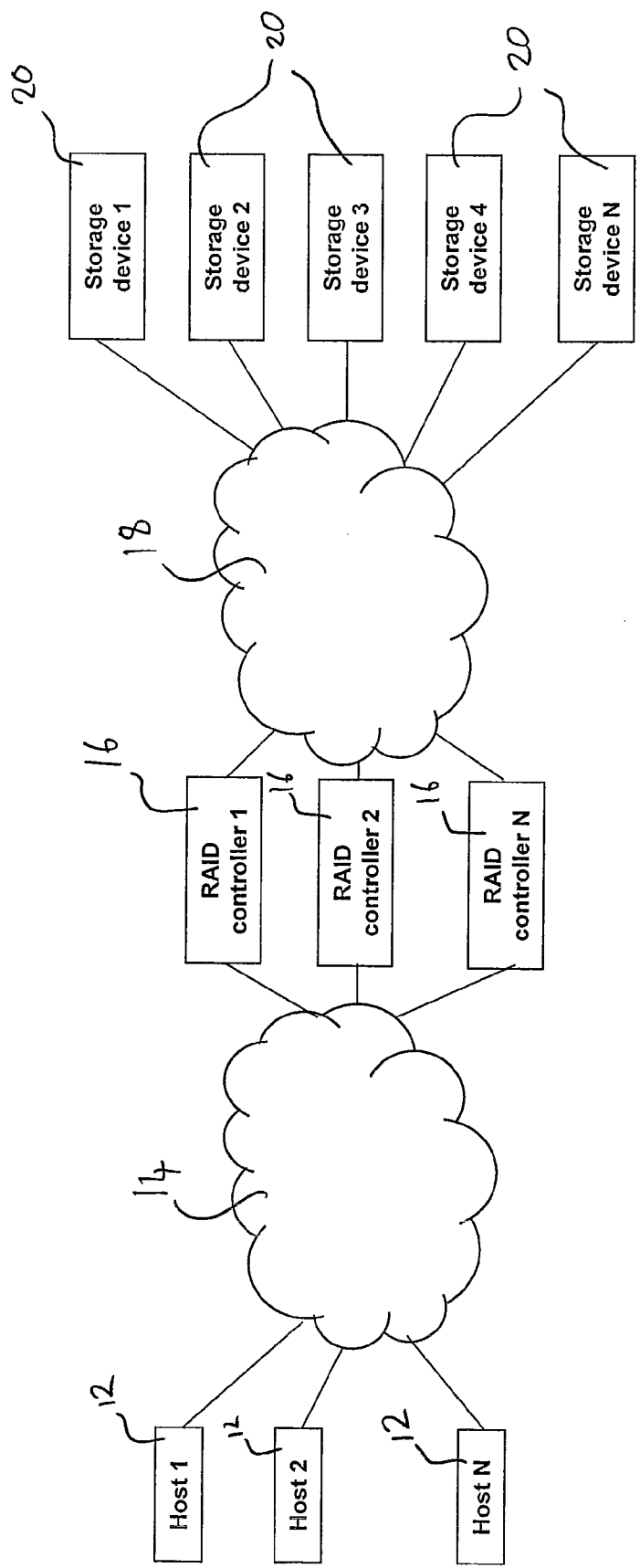
FIG. 1 is a schematic diagram of a networked storage resource.

FIG. 1 shows a schematic illustration of a networked storage resource 10 in which the present invention may be used. The networked storage resource 10 comprises a plurality of hosts 12. The hosts 12 are representative of any computer systems or terminals that are operable to communicate over a network. Any number of hosts 12 may be provided; N hosts 12 are shown in FIG. 1, where N is an integer value.

The hosts 12 are connected to a first communication network 14 which couples the hosts 12 to a plurality of RAID controllers 16. The communication network 14 may take any suitable form, and may comprise any form of electronic network that uses a communication protocol; for example, a local network such as a LAN or Ethernet, or any other suitable network such as a mobile network or the internet.

The RAID controllers 16 are connected through device ports (not shown) to a second communication network 18, which is also connected to a plurality of storage devices 20. The RAID controllers 16 may comprise any storage controller devices that process commands from the hosts 12 and, based on those commands, control the storage devices 20. RAID architecture combines a multiplicity of small, inexpensive disk drives into an array of disk drives that yields performance that can exceed that of a single large drive. This arrangement enables high speed access because different parts of a file can be read from different devices simultaneously, improving access speed and bandwidth. Additionally, each storage device 20 comprising a RAID array of devices appears to the hosts 12 as a single logical storage unit (LSU) or drive.

The operation of the RAID controllers 16 may be set at the Application Programming Interface (API) level. Typically, Original Equipment Manufactures (OEMs) provide RAID networks to end users for network storage. OEMs generally customise a RAID network and tune the network performance through an API.

Any number of RAID controllers 16 may be provided, and N RAID controllers 16 (where N is an integer) are shown in FIG. 1. Any number of storage devices 20 may be provided; in FIG. 1, N storage devices 20 are shown, where N is any integer value.

The second communication network 18 may comprise any suitable type of storage controller network which is able to connect the RAID controllers 16 to the storage devices 20. The second communication network 18 may take the form of, for example, a SCSI network, an iSCSI network or fibre channel.

The storage devices 20 may take any suitable form; for example, tape drives, disk drives, non-volatile memory, or solid state devices. Although most RAID architectures use hard disk drives as the main storage devices, it will be clear to the person skilled in the art that the embodiments described herein apply to any type of suitable storage device. More than one drive may form a storage device 20; for example, a RAID array of drives may form a single storage device 20. The skilled person will be readily aware that the above features of the present embodiment could be implemented in a variety of suitable configurations and arrangements.

The RAID controllers 16 and storage devices 20 also provide data redundancy. The RAID controllers 16 provide data integrity through a built-in redundancy which includes data mirroring. The RAID controllers 16 are arranged such that, should one of the drives in a group forming a RAID array fail or become corrupted, the missing data can be recreated from the data on the other drives. The data may be reconstructed through the use of data mirroring. In the case of a disk rebuild operation, this data is written to a new replacement drive that is designated by the respective RAID controller 16.

Figure 2:
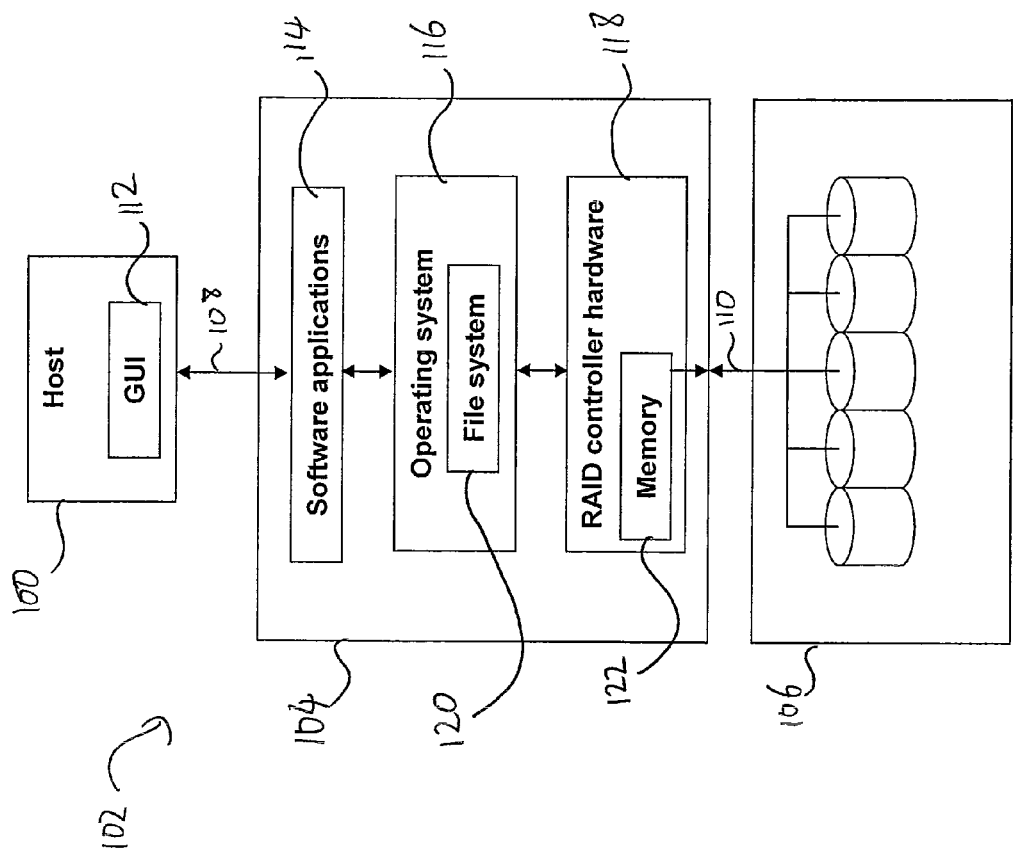
FIG. 2 is a schematic diagram showing a RAID controller suitable for use with the present invention.

FIG. 2 shows a schematic diagram of an arrangement in which the present invention may be used. A storage area network 100 comprises a host 102, a RAID controller 104, and a storage device 106. The host 102 is connected to the RAID controller 104 through a communication network 108 such as an Ethernet and the RAID controller 104 is, in turn, connected to the storage device 106 via a storage network 110 such as an iSCSI network.

The host 102 comprises a general purpose computer (PC) which is operated by a user and which has access to the storage area network 100. Any number of hosts 102 may be provided. However, for clarity, only one host 102 is shown in FIG. 2. A graphical user interface (GUI) 112 is run on the host 102. The GUI 112 is a software application used to input attributes for the RAID controller 104, and acts as a user interface for a user of the host 102.

The RAID controller 104 comprises a software application layer 114, an operating system 116 and RAID controller hardware 118. The software application layer 114 comprises software applications including the algorithms and logic necessary for the initialisation and run-time operation of the RAID controller 104. The software application layer 114 includes software functional blocks such as a system manager for fault management, task scheduling and power management. The software application layer 114 also receives commands from the host 102 (e.g., assigning new volumes, read/write commands) and executes those commands. Commands that cannot be processed (because of lack of space available, for example) are returned as error messages to the user of the host 102.

The operating system 116 utilises an industry-standard software platform such as, for example, Linux, upon which the software applications forming part of the software application layer 114 can run. The operating system 116 comprises a file system 120 which enables RAID controller 104 to store and transfer files.

The RAID controller hardware 118 is the physical processor platform of the RAID controller 104 that executes the software applications in the software application layer 114. The RAID controller hardware 118 comprises a microprocessor, memory 122, and all other electronic devices necessary for RAID control of storage device 106.

Figure 3:
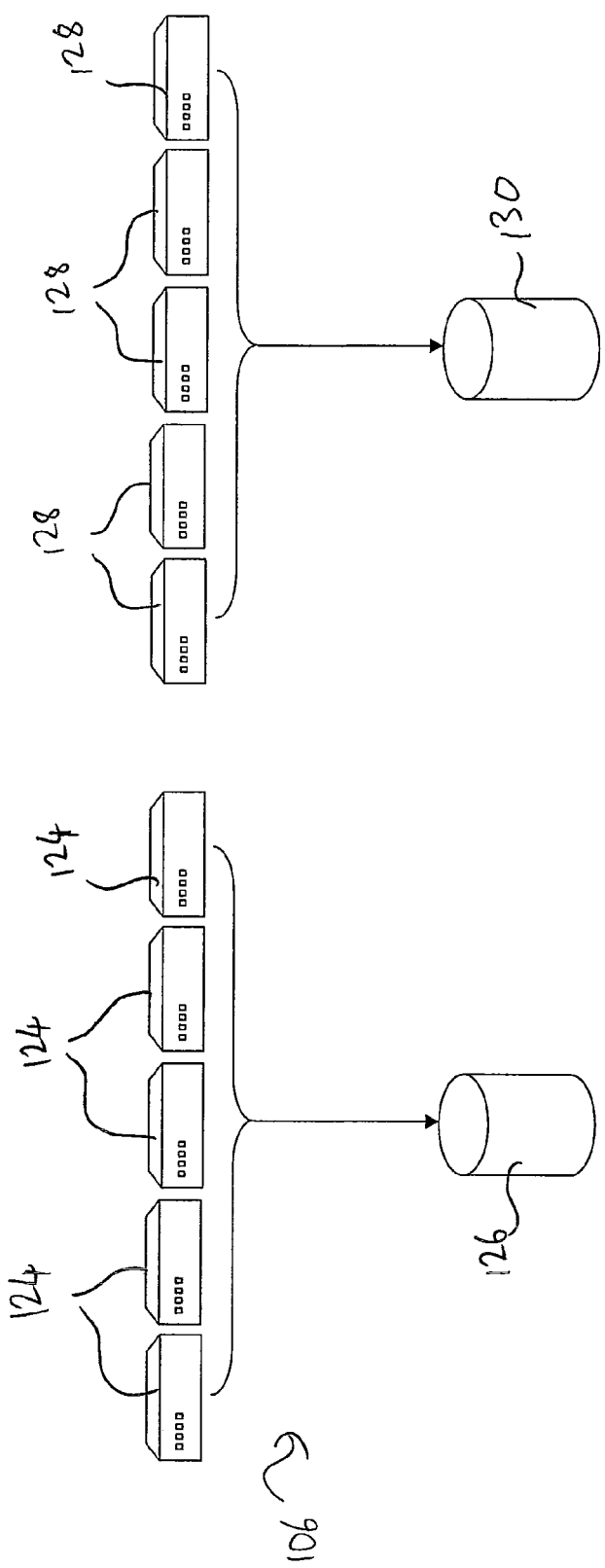
FIG. 3 is a schematic diagram showing physical drives and logical drives.

The storage device 106 comprises a plurality of physical drives (see FIG. 3). The physical drives may be any form of storage device, such as, for example, tape drives, disk drives, non-volatile memory, or solid state devices. Although most RAID architectures use hard disk drives as the main storage devices, it will be clear to the person skilled in the art that the embodiments described herein apply to any type of suitable storage device.

FIG. 3 shows a schematic diagram of the storage device 106 in more detail. The storage device 106 comprises a plurality of physical drives 124. In this embodiment, each physical drive 124 comprises a hard disk drive of large capacity, for example, 1TB. The physical drives 124 form part of a RAID array and the data stored thereon is, in some RAID configurations (for example, RAID-5), stored in the form of data "stripes" in which the data to be stored is broken down into blocks called "stripe units". The "stripe units" are then distributed across the physical drives 124. The RAID controller 104 is arranged such that, should one of the physical drives 124 in the group fail or become corrupted, the missing data can be recreated from the data on the other physical drives 124. The data may be reconstructed through the use of the redundant "stripe units" stored on the remaining physical drives 124.

The RAID array of physical drives 124 is, via the RAID controller 104, presented as a logical drive 126, upon which one or more volumes may be defined and which can be read/write accessed by the host 102. The logical drive 126 may be considered to be a usable region of storage capacity located on one or more physical disk drive components forming the logical drive 126. The RAID array of physical drives 124 may comprise any number of logical drives 126. However, for clarity, only one is shown and described herein.

The logical drive 126 can be accessed by the host 102 and RAID controller 104 to read/write data. Input/output processing can also be carried out on the logical drive 126 in the manner of an actual physical drive; for example, defragmentation, rebuilding or backup operations.

In order to provide data security and redundancy, it is important to backup the data stored on a logical drive 126 at regular intervals. This is known as logical drive duplication. This enables a user on the host 102 to generate an identical copy of the logical drive 126 for backup or reference purposes. The copy of the logical drive 126 may reside on an entirely different logical drive 126 or on a dedicated backup storage facility such as a tape drive. The copied logical drive is known as the source logical drive and the copied data is written to what is known as a destination logical drive.

In FIG. 3, the logical drive 126 forms the source logical drive. FIG. 3 also shows a configuration of a suitable destination logical drive. A plurality of physical drives 128 form a RAID array, similar to the physical drives 124. The physical drives 128 are controlled by a further RAID controller (not shown) different from the RAID controller 104. The further RAID controller (not shown) presents the physical drives 128 as a single logical drive 130. The RAID array of physical drives 128 may, through the further RAID controller, comprise any number of logical drives 130. However, for clarity, only one is shown and described herein.

In many cases, the time taken to duplicate a large logical drive may be considerable. If a logical drive has to be taken offline or cannot be accessed for read/write operations for a considerable period, then time and efficiency losses to the users of the storage area network may be significant. High-demand systems or critical-access systems cannot afford to be inoperative for such time periods. The arrangement for duplicating a logical drive will now be described with reference to FIG. 4.

Figure 4:
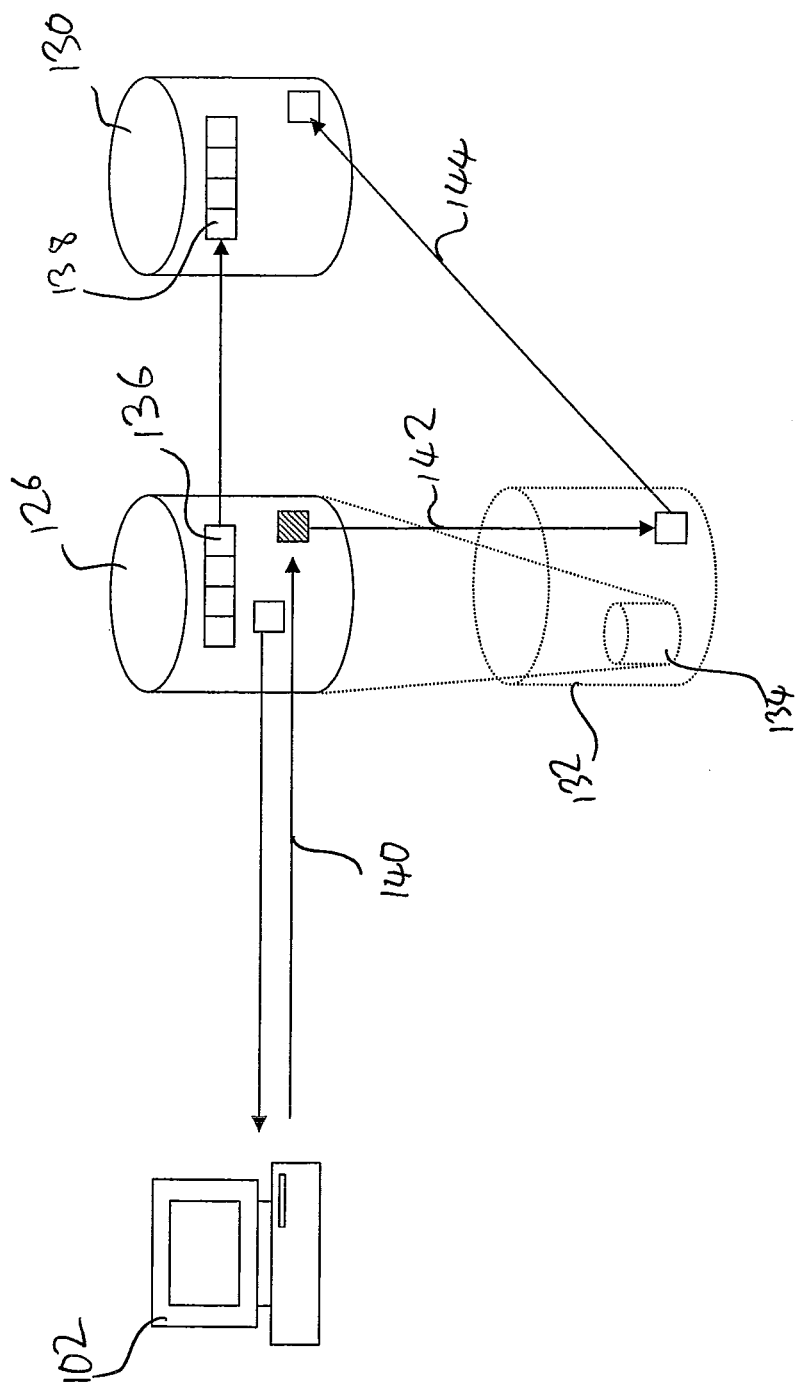
FIG. 4 is a schematic diagram of the elements and process procedure of a duplication operation.

FIG. 4 shows a schematic diagram of a logical drive duplication operation. The source logical drive 126 is shown. The destination logical drive 130 is the destination for the duplication operation. Once the duplication operation is complete, the destination logical drive 130 will be an identical copy of the source logical drive 126 at the time the duplication operation was initiated. Therefore, the duplicate of the data on the destination logical drive 130 will not include any writes or other changes to the data that occur after the duplication operation has started and, instead, provides an exact reproduction of the source logical drive at the precise moment that the duplication operation is started.

There is also provided a snapshot logical drive 132. The snapshot logical drive 132 comprises an additional storage area into which certain types of data will be stored during the duplication operation. The snapshot logical drive 132 may be a separate logical drive from the source logical drive 126. Alternatively, the snapshot logical drive 132 may form a part of the source logical drive 126.

The snapshot logical drive 132 comprises a snapshot 134. The snapshot 134 is created at the same time that the duplication operation is started, and comprises metadata relating to where the original data on the source logical drive 126 is stored. The snapshot 134 does not contain a physical copy of the data on the source logical drive 126. Therefore, the snapshot 134 is created almost instantaneously when the duplication operation is started.

Figure 5:
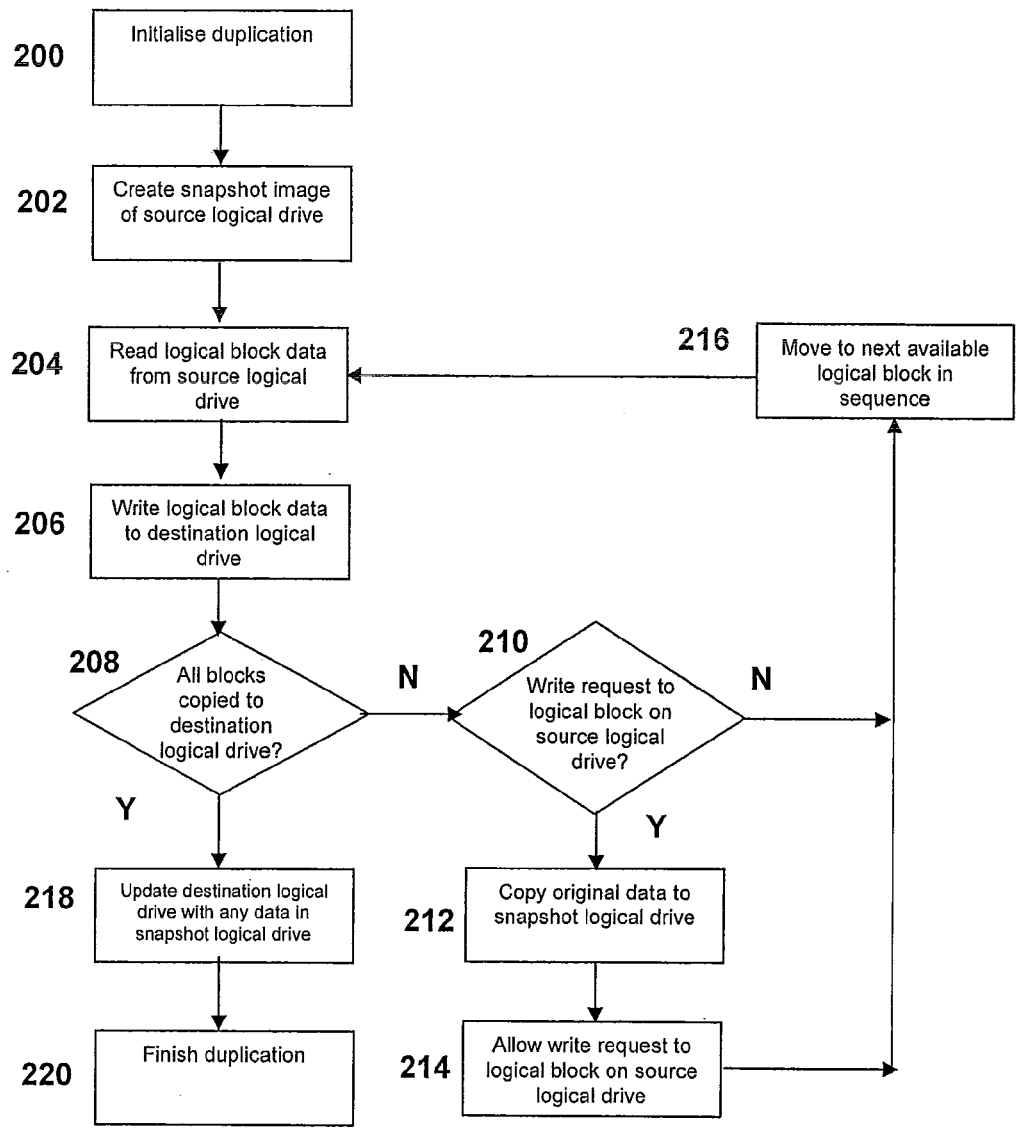
FIG. 5 is a flow diagram illustrating a known duplication method.

The duplication method will now be described with reference to FIGS. 4 and 5. FIG. 5 shows a flow diagram of the method for duplicating the source logical drive 126 on the destination logical drive 130.

Step 200: Initialise Duplication

At step 200, the duplication is initialised at a time $T_1$. In other words, the duplication is started. When the duplication is complete, the destination logical drive 130 will comprise a copy of the source logical drive 126 at time $T_1$ when the duplication process was started.

This step may simply be a reference point identifying when the duplication was started, and need not require any actions to be carried out. Alternatively, additional steps may be carried out as appropriate prior to copying of data from the source logical drive 126; for example, logging the time at which the duplication was started or initialising required programs. The skilled person will be readily aware that this step could be implemented in a variety of suitable approaches and arrangements.

At this point, the snapshot logical drive 132 may also be created. This temporary drive may be created on spare space on the source logical drive 126 or the data area for the snapshot may be located elsewhere. Once the destination logical drive 130 and snapshot logical drive 132 are created, the duplication process can be initialised.

Step 202: Create Snapshot Image of Source Logical Drive

At step 202, a snapshot 134 of the source logical drive 126 is created by a snapshot engine. The snapshot 134 is a point in time representation of the source logical drive 126 at the moment the duplication process is initialised, i.e. at time $T_1$. This enables any changes to the original data on the source logical drive 126 to be monitored and logged so that the destination logical drive 130 can hold an exact duplication of the source logical drive 126 when the duplication operation has completed. When the snapshot 134 is created, 110 accesses to the source logical drive 126 may have to be temporarily frozen; however, the creation of the snapshot 134 is extremely fast and so any accessing applications will not be frozen for a significant period of time. The duplication method then proceeds to step 204.

Step 204: Read Logical Block Data From Source Logical Drive

At step 204, data is read from the source logical drive 126. This is the first part of the copy process—the read data is then written to the destination logical drive 130 in step 206 to complete the copy process. The data is read from data areas specified in units of logical blocks 136 (see FIG. 4) from the source logical drive 126. In the described example, the copy process starts with the first logical block 136 in sequence on the source logical drive 126, i.e. the data is read from the first logical block "0" in a sequence of logical blocks from 0 to N. However, any sequence may be used; for example, the read operation may start at logical block N or at any other suitable point. The method then proceeds to step 206.

Alternatively, the step of reading may be performed in terms of multiple blocks. The skilled person would be readily aware of possible variations in the step reading of the blocks and the combinations of blocks which could be read in a single step.

Step 206: Write Logical Block Data to Destination Logical Drive

At step 206, the data from the logical block 136 read in step 204 is copied to the destination logical drive 208 to create a duplicate 138 of the logical block 136 on the destination logical drive 130. This is shown in FIG. 4. The method then proceeds to step 208.

Step 208: All Blocks Copied to Destination Logical Drive?

Throughout the copy process, it is determined whether all of the logical blocks on the source logical drive 126 have been copied to the destination logical drive 130. If the determination is positive, then the method proceeds to step 220. If, however, it is determined that there are still logical blocks to be copied on the source logical drive 126, then the method proceeds to step 210.

Whilst step 208 has been referred to herein as occurring after the first read and write steps, it will be appreciated that this step may be carried out at any point during the duplication process, or may be continuously checked for. The example shown and described herein is organised stepwise for clarity. However, the skilled person will be readily aware that this step could be implemented in a variety of suitable approaches and arrangements.

Step 210: Write Request to Logical Block on the Source Logical Drive?

At step 210 it is determined whether the host 102 has issued a write request 140 (FIG. 4) to a logical block on the source logical drive 126 since the duplication process was initiated at step 200. This applies to any logical block on the source logical drive 126 and not just to logical blocks which are currently being copied.

If it determined that a write request 140 to a logical block on the source logical drive 126 is detected, then the method proceeds to step 212. If no write request to the source logical drive 126 is detected, then the method proceeds to step 218.

The step of determining whether the host 102 has issued a write request 140 to a logical block on the source logical drive 126 since the duplication process was initiated has been referred to herein as occurring after the first read and write steps and after the determination of whether all logical blocks have been copied. However, it will be appreciated that this step may be carried out at any point during the duplication process, or may be continuously checked for throughout the duplication process. The example shown and described herein is organised stepwise for clarity. However, the skilled person will be readily aware that this step could be implemented in a variety of suitable approaches and arrangements.

Step 212: Copy Original Data to Snapshot Logical Drive

If, at step 210 a write request 140 to a logical block is detected, then the original data on that particular logical block is copied in a copy operation 142 (FIG. 4) to the snapshot logical drive 132 prior to the write request 140 being allowed. This is known as "copy on write". This preserves the original data in the snapshot data area. The method then proceeds to step 214.

Step 214: Allow Write Request to Logical Block

Once the original data in the write-requested logical block has been copied to the snapshot logical drive 132, then that particular logical block of data is now recorded safely and the write request 140 to that particular logical block can be allowed.

The method then proceeds to step 216.

Step 216: Move to Next Available Logical Block in Sequence

At step 216, the sequential copy process proceeds. In this example, after a copy process of the first logical block of data from the source logical drive 126 to the destination logical drive 130 in steps 204 and 206, then at step 218 the process moves to the next available logical block in the sequence of logical blocks. In other words, the sequential copy process moves to data stored in another data area. In this example, this will usually be the next block in the sequence of 0 to N.

Alternative sequence patterns may be used. The data may be read in any suitable sequence format; for example, in terms of logical blocks, data addresses or data areas, hard drive sectors or particular regions of the physical drive. Further, any suitable sequence of data area copying may be used; for example, random, a count down from logical block N to logical block 0, or a different sequential copy pattern arranged in terms of rows, columns or any other pre-determined order.

The method then proceeds back to step 204 wherein the selected logical block is read and then, at step 206, written to the destination logical drive 130 to complete the copy process for that particular block of data.

This process continues in the sequential copy process until it is determined at step 208 that all logical blocks have been copied from the source logical drive 126 to the destination logical drive 130.

Step 218: Update Destination Drive With Any Data on Snapshot Logical Drive

Step 218 occurs once the sequential copy process in steps 204, 206 and 218 has been completed. At this point, the process determines whether any data has been copied from write-requested logical blocks to the snapshot logical drive 132 during the duplication process.

If such data exists, then a "snapback" process 144 (FIG. 4) is carried out. This involves copying the logical blocks of data stored on the snapshot logical drive 132 to the destination logical drive 130. This is so that the destination logical drive 130 contains an exact copy of the data on the source logical drive 126 at the time $T_1$ when the duplication process was initialised.

The method then proceeds to step 220.

Step 220: Finish Duplication

At step 220, the destination logical drive 130 now contains an exact copy of the data on the source logical drive 126 at time $T_1$, i.e. the moment the duplication process was initialised at step 200.

Variations to the above method may be carried out. For example, the sequential copy process may copy from the snapshot logical drive and not directly from the source logical drive 126. This means that step 218 is not required because there is no need to perform a "snapback" operation to remove temporary corruption from the destination logical drive 130.

In this case, if data in a data area has not changed since time $T_1$, then the snapshot logical drive will refer the copy engine back to data on the source logical drive. However, if data in a data area has changed since time $T_1$, then copy on write process will have occurred and the snapshot logical drive will store an original copy of the data in the data area. in this case, the data is copied directly from the snapshot logical drive.

After the duplication process has been completed, the destination logical drive 130 will contain an identical copy of the source logical drive 126 at time $T_1$. The duplicate of the data from source logical drive 126 on the destination logical drive 130 can now be used as required; for example, as the basis for a tape back-up copy, or otherwise.

Once the duplication process has been completed no more data is shared between the source logical drive 126 and the destination logical drive 130. Normal Operating System (OS) read and write requests are now allowed to happen to the source logical drive 126 and this will cause the data on the source logical drive 126 to change and to diverge, over time, from the duplicate of the data on the destination logical drive 130 taken at time $T_1$.

Once the copy of the data on the destination logical drive 130 has been utilised, it may be required to perform another duplication operation to once again bring the data on the destination logical drive 130 back into synchronisation with the data on the source logical drive 126. In other words, it may be required to perform another duplication operation to make the destination logical drive 130 an identical copy of the source logical drive 126 at a time later than time $T_1$.

Figure 6:
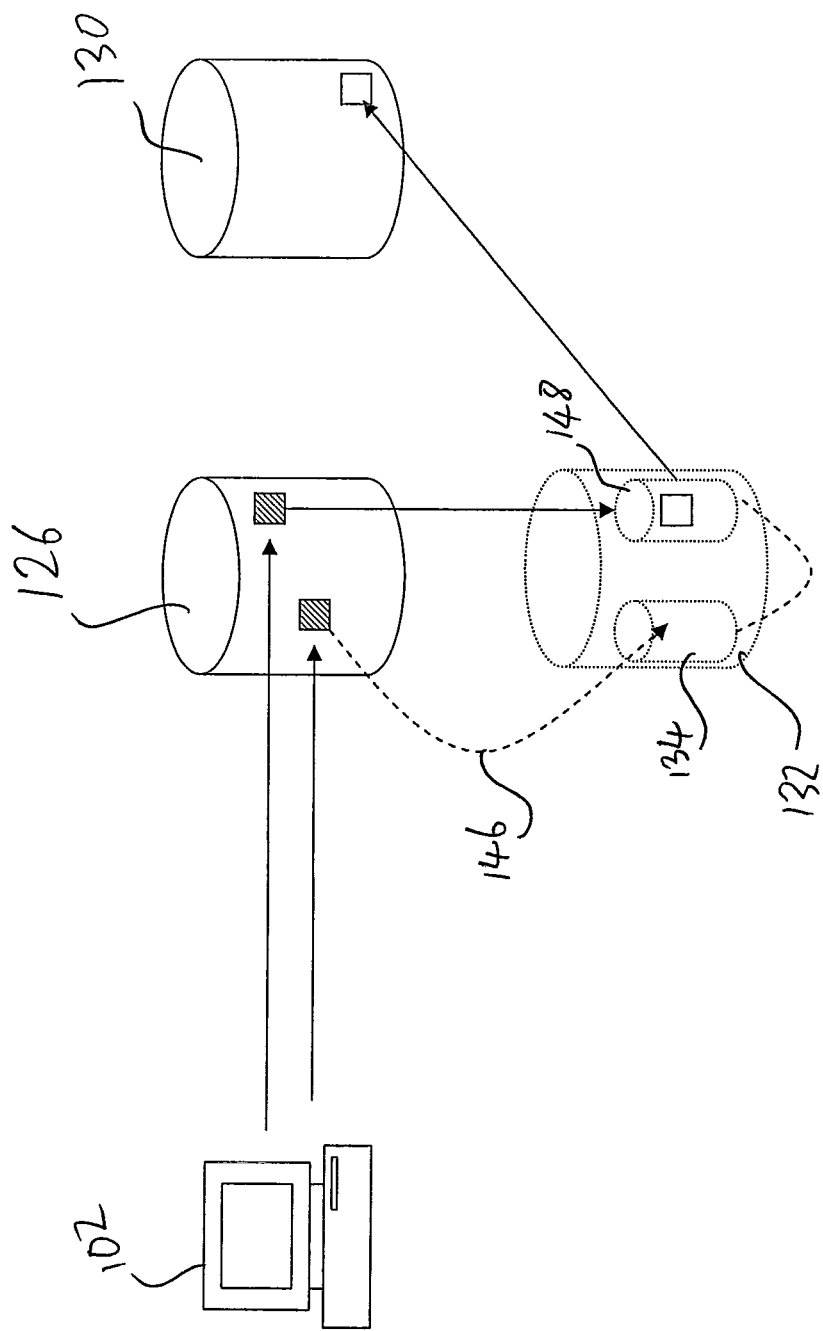
FIG. 6 is a schematic diagram of the elements and process procedure of a duplication resynchronisation operation according to a first embodiment of the invention.

FIG. 6 shows a schematic diagram of a logical drive resynchronisation operation according to an embodiment of the present invention. The source logical drive 126 is shown. The destination logical drive 130, which is an exact copy of the source logical drive at time $T_1$, is to be resynchronised with the source logical drive 126 as it appears at time $T_2$. Once the resynchronisation operation is complete, the destination logical drive 130 will be an identical copy of the source logical drive 126 at time $T_2$. Therefore, the duplicate of the data on the destination logical drive 130 will not include any writes or other changes to the data that occur after the time $T_2$.

As previously described, the snapshot logical drive 132 comprises an additional storage area into which certain types of data will be stored during the duplication operation. The snapshot logical drive 132 may be a separate logical drive from the source logical drive 126. Alternatively, the snapshot logical drive 132 may form a part of the source logical drive 126.

The snapshot logical drive 132 comprises the snapshot 134 taken at time $T_1$. The snapshot 134, immediately after the duplication operation is completed at step 220, comprises metadata relating to where the original data on the source logical drive 126 is stored and copy on write data where writes were requested to the source logical drive 126 during the copy process.

The snapshot 134 is kept running after the duplication operation has completed and is modified so that the snapshot 134 no longer stores any copy on write data in response to write requests addressed to data areas on the source logical drive 126.

Therefore, whilst the snapshot 134 will contain both metadata and copy on write data from the earlier duplication process initiated at time $T_1$, the snapshot 134 will only store metadata 146 relating to changes occurring to the data on the source logical drive 126 after the earlier duplication operation has been completed at step 220.

Therefore, the snapshot 134 will be relatively small in size because the snapshot 134 will only comprise metadata relating to the changed data on the source logical drive 126 after the duplication operation has completed.

Figure 7:
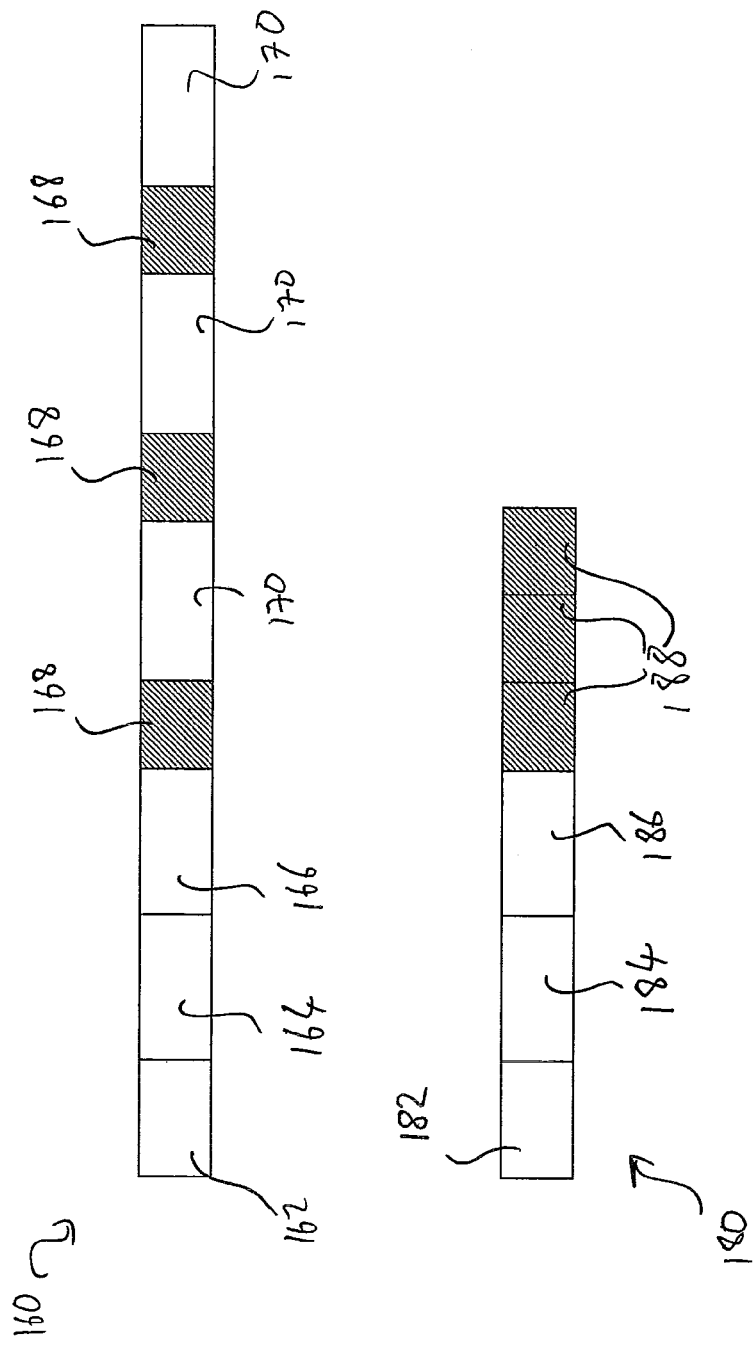
FIG. 7 is a schematic diagram of a known snapshot data format and a snapshot data format according to embodiments of the invention.

FIG. 7 shows examples of a known snapshot data storage format on a snapshot logical drive, and a snapshot according to an embodiment of the invention. A known snapshot 160 comprises three initial data areas: Header information (HDR) 162, SAT 164 and PMAP 166.

The above data areas are followed by the actual data representing the changed data areas on the source logical drive 126. These data areas comprise a Stripe Header (SH) 168 and a data packet 170. The SH 168 comprises an address tag identifying a data area (e.g. a logical block or a sector on the physical disk) on the source logical drive 126 which has changed since the snapshot was started. The data packet 170 comprises the original data from a data area on the source logical drive 126 which has been copied to the snapshot logical drive 132 in a copy on write operation. This copy on write operation has been carried out to preserve the original data on the source logical drive 126 prior to allowing a write request to that particular data area.

FIG. 7 also shows a snapshot data format according to an embodiment of the present invention. The snapshot 180 comprises the same three initial data areas as the known snapshot 160, namely Header information (HDR) 182, a Storage Allocation Table (SAT) 184 and a Protection Map (PMAP) 186. These features are application- and implementation-specific and are non-limiting. The skilled person would be readily aware of variations or alternatives which could be employed in this arrangement in order to achieve the benefits of the present invention.

The snapshot 180 also comprises stripe headers (SHs) 188 which each comprise an address tag identifying a data area (e.g. a logical block or a sector on the physical disk) on the source logical drive 126 which has changed since the snapshot was started.

However, in contrast to the known snapshot data format 160, the snapshot 180 does not comprise any data packets or copy on write data. Therefore, the snapshot 180 merely contains a record of the data which has changed without storing a record of the original data which has been overwritten or deleted.

When a further duplication operation is required at a time $T_2$, a further, resynchronisation snapshot 148 is created on the snapshot logical drive 132. The resynchronisation snapshot 148 is used in the same manner as the snapshot 134 was during the previous copy process. However, in this case, the copy engine is configured to refer to the snapshot 134 in a referral process 150 in order to determine which data areas to copy from the resynchronisation snapshot 148 to the destination logical drive 130 to resynchronise the two logical drives 126, 130.

In the snapshot 180, only snapshot metadata is being generated and stored on the snapshot overwrite data area. This metadata is generated the same way as for a known snapshot 160 but without the pointers to the copy-on-write data since no data is actually copied.

Figure 8:
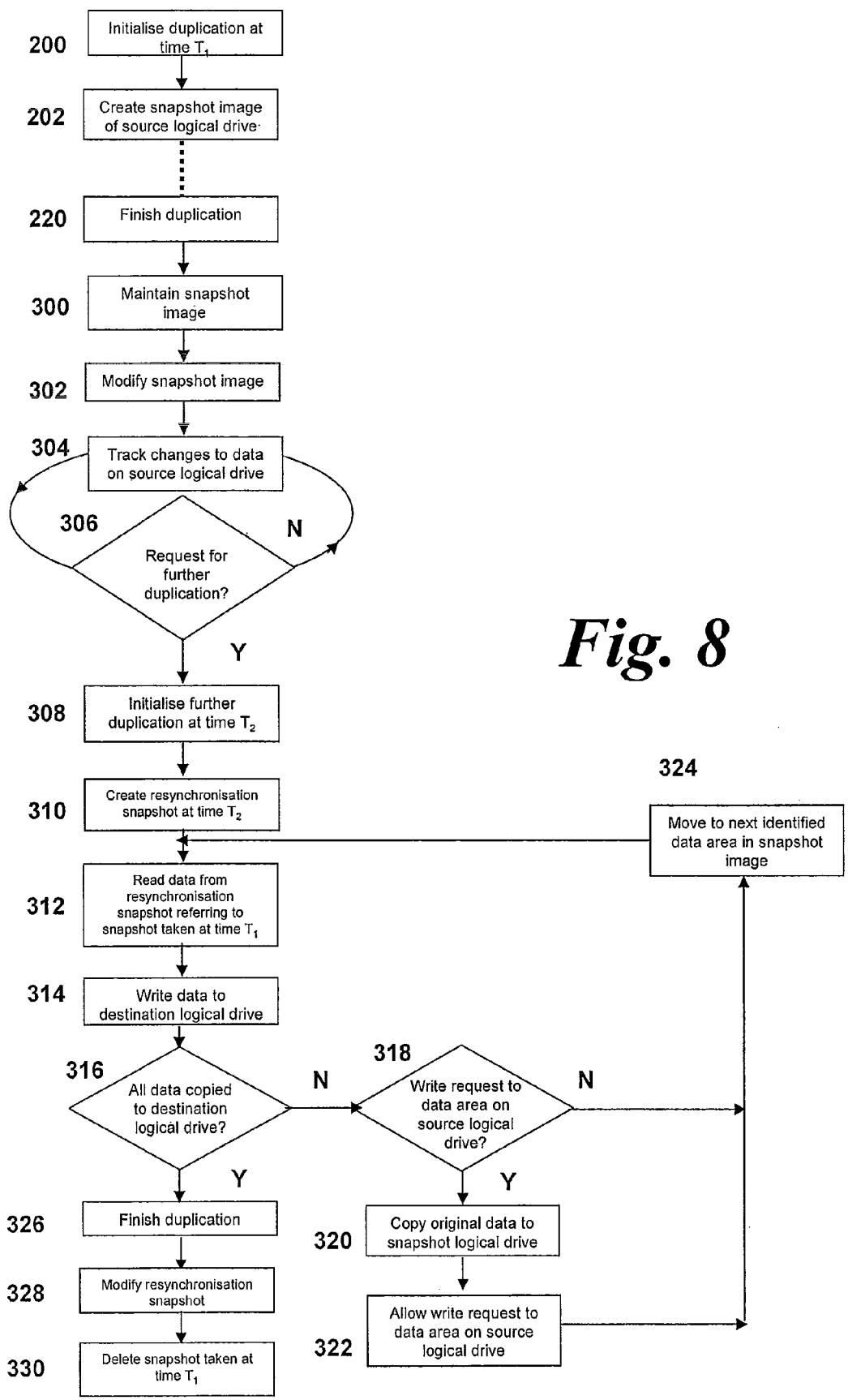
FIG. 8 is a flow diagram illustrating a duplication and resynchronisation method according to a first embodiment of the invention.

A method to enable the destination logical drive 130 to be re-synchronised with the source logical drive 126 according to a first embodiment of the invention is shown in FIG. 8. FIG. 8 shows, for consistency, steps 200, 202 and 220 of FIG. 5.

However, the remainder of the steps of FIG. 5 are not shown for reasons of clarity and conciseness.

Step 300: Maintain Snapshot Image

Normally, when the duplication operation previously described with reference to FIG. 5 is completed, the snapshot 134 is no longer needed and is deleted. However, in the method according to an embodiment of the present invention, the snapshot 134 is maintained.

The snapshot 134 comprises metadata relating to the configuration of the data on the source logical drive 126 at time $T_1$ when the earlier duplication operation was initialised at step 200. The snapshot 134 also contains a copy of any original data on the source logical drive 126 at time $T_1$ in a data area to which a write request was issued during the copy process. This is the "copy on write" data which was used to update the destination logical drive 130.

Instead of deleting the snapshot 134 when the earlier duplication operation is completed, the snapshot 134 is maintained and the snapshot is kept running.

Step 302: Modify Snapshot

At step 300, the snapshot 134 from the previous duplication is maintained, i.e. not deleted. In step 302, the snapshot 134 is modified so that the snapshot 134 no longer stores any copy on write data in response to write requests addressed to data areas on the source logical drive 126. Therefore, whilst the snapshot 134 will contain both metadata and copy on write data from the earlier duplication process initiated at time $T_1$, the snapshot 134 will only store metadata relating to changes occurring to the data on the source logical drive 126 after the earlier duplication operation has been completed at step to 220. Therefore, the snapshot 134 will be relatively small in size because the snapshot 134 will only comprise metadata relating to the changed data on the source logical drive 126 after the duplication operation has completed.

Step 304: Track Changes to Data on Source Logical Drive

By keeping the snapshot 134 running after the duplication operation has finished, a record can be kept of any changes made to the data on the source logical drive 126 since time $T_1$ (i.e. the time at which the earlier duplication operation was started). The changes to the data may comprise write requests which overwrite data previously stored at a particular data area, deletions, or newly-added data. For each incoming write request addressed to a data area on the source logical drive 126, metadata relating to the changed data at that particular data area will be stored in the snapshot 134.

Since the snapshot 134 only records metadata relating to the data which has changed, then the snapshot 134 will neither take up excessive storage space nor be resource-intensive to update. In contrast, if the snapshot 134 continued to store copy on write data for every write request to the source logical drive 126 after the duplication operation had finished, the storage space required to store the snapshot 134 would be large. Further, the speed at which the system could operate would be seriously compromised because, for every write request to the source logical drive 126, the copy on write data would have to be saved to the snapshot 134 before the write could be executed to the source logical drive 126.

Step 306: Request for Further Duplication?

At step 306, it is determined whether a request for a further duplication has been received. This may be specified by a user, or may be predetermined to occur automatically a set interval.

If no duplication is required, then the method proceeds back to step 304 and continues to track the changes made to the source logical drive 126.

If a further duplication is required to bring the destination logical drive back into synchronisation with the source logical drive 126, then the method proceeds to step 308.

Step 308: Initialise Further Duplication

In step 308, a further duplication is initialised at a time $T_2$ which is later than time $T_1$. In other words, the further duplication is started at time $T_2$. When the further duplication is complete, the destination logical drive 130 will comprise a copy of the source logical drive 126 at time $T_2$ when the further duplication process was started.

This step may simply be a reference point identifying when the duplication was started, and need not require any actions to be carried out. Alternatively, additional steps may be carried out as appropriate prior to copying of data from the source logical drive 126; for example, logging the time at which the duplication was started or initialising required programs. The skilled person will be readily aware that this step could be implemented in a variety of suitable approaches and arrangements.

The method proceeds to step 310.

Step 310: Create Resynchronisation Snapshot

A further snapshot 148 is taken at time $T_2$ when the duplication is initialised. The further, or resynchronisation, snapshot 148 ensures that any writes issued to the source logical drive 126 during the duplication process do not affect the copy of the data copied to the destination logical drive 130 and that the destination logical drive 130 comprises, at the end of the copy process, an identical copy of the source logical drive 126 at time $T_2$.

Step 312: Read Data From Resynchronisation Snapshot

At step 310 the data from the resynchronisation snapshot is read. This is the first part of the copy process—the read data is then written to the destination logical drive 130 in step 314 to complete the copy process.

However, there is no need to copy data from the source logical drive 126 or snapshot 134 which has not changed since the earlier duplication process occurred at time $T_1$. Therefore, the copy engine refers to the snapshot 134 (which has been running since time $T_1$) to indicate which data areas or blocks have been changed since the previous duplication at time $T_1$.

In other words, the snapshot 134 contains metadata referring to only the data areas on the source logical drive 126 which have been modified, changed, written to, deleted or added to between times $T_1$ and $T_2$. The resynchronisation snapshot 148 enables the data configuration on the source logical drive 126 to be effectively "frozen" at time $T_2$. Therefore, the resynchronisation snapshot 148 does not comprise any physical data corresponding to activity occurring on the source logical drive 126 after time $T_2$. Any incoming writes to the source logical drive 126 will be subject to a copy on write operation, i.e. the original data at the write-requested data area will be copied to the resynchronisation snapshot data area prior to the write being allowed.

Step 314: Write Data to Destination Logical Drive

At step 312, the data read in step 310 is copied to the destination logical drive 130. The data written to the destination logical drive 130 is data which has changed in between times $T_1$ and $T_2$. The written data area on the destination logical drive 130 now corresponds to that on the source logical drive 126 at time $T_2$. The method then proceeds to step 208.

Step 316: All Data Copied to Destination Logical Drive?

Throughout the resynchronisation process, it is determined whether all of the data on the source logical drive 126 which has changed between times $T_1$ and $T_2$ has been copied to the destination logical drive 130. If the determination is positive, then the method proceeds to step 326. If, however, it is determined that, with reference to the snapshot 134, there is still data to be copied from the source logical drive 126 to the destination logical drive 130, then the method proceeds to step 318.

Whilst this has been referred to herein as occurring after the first read and write steps, it will be appreciated that this step may be carried out at any point during the duplication process, or may be continuously checked for. The example shown and described herein is organised stepwise for clarity. However, the skilled person will be readily aware that this step could be implemented in a variety of suitable approaches and arrangements.

Step 318: Write Request to Data Area on the Source Logical Drive?

At step 318, similarly to step 210 described previously, it is determined whether the host 102 has issued a write request 140 (FIG. 4) to a data on the source logical drive 126 since the resynchronisation process was initiated at time $T_2$ (step 308).

If it determined that a write request 140 to a data area (e.g. a logical block) on the source logical drive 126 is detected, then the method proceeds to step 320. If no write request to the source logical drive 126 is detected, then the method proceeds to step 324.

The step of determining whether the host 102 has issued a write request 140 to a logical block on the source logical drive 126 since the resynchronisation process was initiated has been referred to herein as occurring after the first read and write steps and after the determination of whether all logical blocks have been copied. However, it will be appreciated that this step may be carried out at any point during the duplication process, or may be continuously checked for throughout the duplication process. The example shown and described herein is organised stepwise for clarity. However, the skilled person will be readily aware that this step could be implemented in a variety of suitable approaches and arrangements.

Step 320: Copy Original Data to Snapshot Logical Drive

If, at step 320 a write request 140 to a data area is detected, then the original data on that particular data area on the source logical drive 126 is copied in a copy operation 142 (FIG. 4) to the snapshot logical drive 132 prior to the write request 140 being allowed. This is known as "copy on write". This preserves the original data in the snapshot data area so that the resynchronisation snapshot is representative of the data on the source logical drive 126 at time $T_2$ when the resynchronisation operation is initiated. The method then proceeds to step 322.

Step 322: Allow Write Request to Data Area

Once the original data in the write-requested data area (e.g. logical block) has been copied to the snapshot logical drive 132, then that particular data area is now recorded safely and the write request 140 to that particular data area can be allowed.

The method then proceeds to step 324.

Step 324: Move to Next Identified Data Area in Snapshot at Time $T_1$

At step 324, the resynchronisation process proceeds. In this example, at step 324 the resynchronisation process moves to the next data area to be copied as specified by the snapshot 134 which comprises a record of which data areas have been changed or modified between times $T_1$ and $T_2$.

Alternative sequence patterns may be used, provided that the data read is only data which has changed in between times $T_1$ and $T_2$. The data may be read in any suitable sequence format; for example, in terms of logical blocks, data addresses or data areas, hard drive sectors or particular regions of the physical drive. Further, any suitable sequence of data area copying may be used; for example, random, a count down from logical block N to logical block 0, or a different sequential copy pattern arranged in terms of rows, columns or any other pre-determined order.

The method then proceeds back to step 312 wherein the identified data is read and then, at step 314, written to the destination logical drive 130 to complete the copy process for that particular data area.

This process continues until it is determined at step 316 that all data areas which have been changed between times $T_1$ and $T_2$ have been copied from the source logical drive 126 to the destination logical drive 130.

Step 326: Finish Duplication

At step 328, the destination logical drive 130 now contains an exact copy of the data on the source logical drive 126 at time $T_2$, i.e. the moment the resynchronisation process was initialised at step 308. The method then proceeds to step 328.

Step 328: Modify Resynchronisation Snapshot

At step 328, the resynchronisation snapshot is converted into a "dataless snapshot" in the same manner as set out in step 302 for the snapshot 134. In other words, the resynchronisation snapshot is modified so that the resynchronisation snapshot no longer stores any copy on write data in response to write requests addressed to data areas on the source logical drive 134. Therefore, whilst the resynchronisation snapshot will contain both metadata and copy on write data from the time period between time $T_2$ and the time the duplication operation terminates at step 326, the resynchronisation snapshot will only contain metadata relating to changes occurring to the data on the source logical drive 126 after step 326 has been completed.

Therefore, the resynchronisation snapshot will be relatively small in size because the resynchronisation snapshot will only comprise metadata relating to the changed data on the source logical drive 126 after the resynchronisation operation has completed at step 326.

Step 330: Delete Snapshot Taken at Time $T_1$

Once the resynchronisation snapshot has been converted to a snapshot format similar to the snapshot 180 shown in FIG. 7, there is no longer any need to keep the snapshot 134 which specifies changes made between times $T_1$ and $T_2$, and so the snapshot 134 can be deleted. This is because the snapshot 148 can provide a complete record of changes made to the data on the source logical drive 126 after time $T_2$.

Should a further resynchronisation of the destination logical drive 130 to the source logical drive 126 be required at a later time (i.e. later than time $T_2$) then a further resynchronisation snapshot can be taken at a time $T_3$ and the earlier resynchronisation snapshot (taken at time $T_2$) can be used to direct the copy process to the data areas which have changed in between times $T_2$ and $T_3$.

Figure 9:
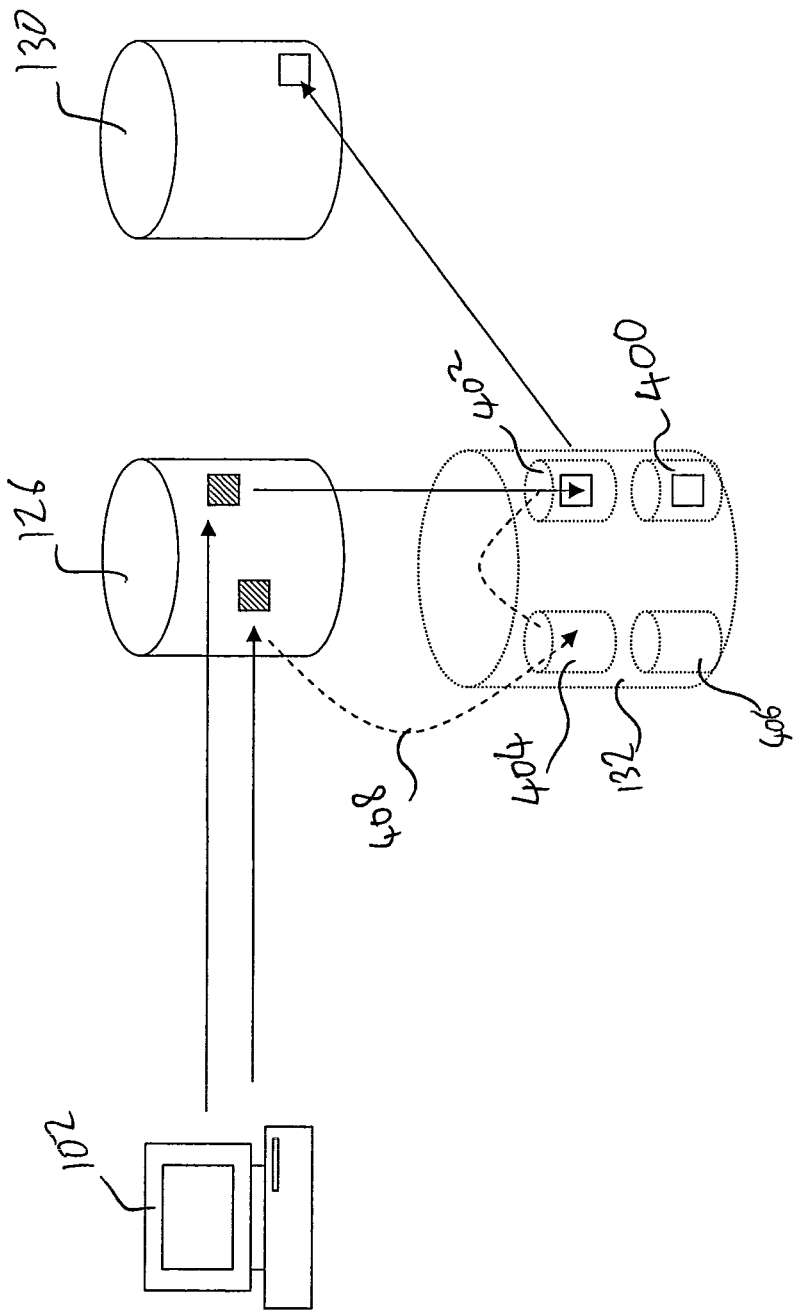
FIG. 9 is a schematic diagram of the elements and process procedure of a duplication resynchronisation operation according to a second embodiment of the invention.

FIG. 9 shows a schematic diagram of a logical drive resynchronisation operation according to a second embodiment of the present invention. The source logical drive 126 is shown. The destination logical drive 130 will, after the duplication operation, comprise an exact copy of the source logical drive at a time $T_4$. At a later time, the destination logical drive 130 is to be resynchronised with the source logical drive 126 as it appears at time $T_5$ which is later than time $T_4$. Once the resynchronisation operation is complete, the destination logical drive 130 will be an identical copy of the source logical drive 126 at time $T_4$. Therefore, the duplicate of the data on the destination logical drive 130 will not include any writes or other changes to the data that occur after the time $T_5$.

As previously described, the snapshot logical drive 132 comprises an additional storage area into which certain types of data will be stored during the duplication operation. The snapshot logical drive 132 may be a separate logical drive from the source logical drive 126. Alternatively, the snapshot logical drive 132 may form a part of the source logical drive 126.

The snapshot logical drive 132 comprises a snapshot 400 taken at time $T_4$ and a snapshot 402 taken at time $T_5$. The snapshots 400, 402 have the same format as the snapshot 160, i.e. the snapshots 400, 402 comprise both metadata and data.

The snapshot logical drive 132 also comprises snapshots 404, 406. Snapshot 404 is also taken at time $T_4$. Snapshot 406 is taken at time $T_5$. The snapshots 404, 406 both have the same format as snapshot 180 shown in FIG. 7. Therefore, snapshot 404 comprises only metadata relating to changes occurring on the source logical drive 126 since time $T_4$. Snapshot 406 only comprises metadata relating to changes occurring on the source logical drive 126 since time $T_5$.

Figure 10:
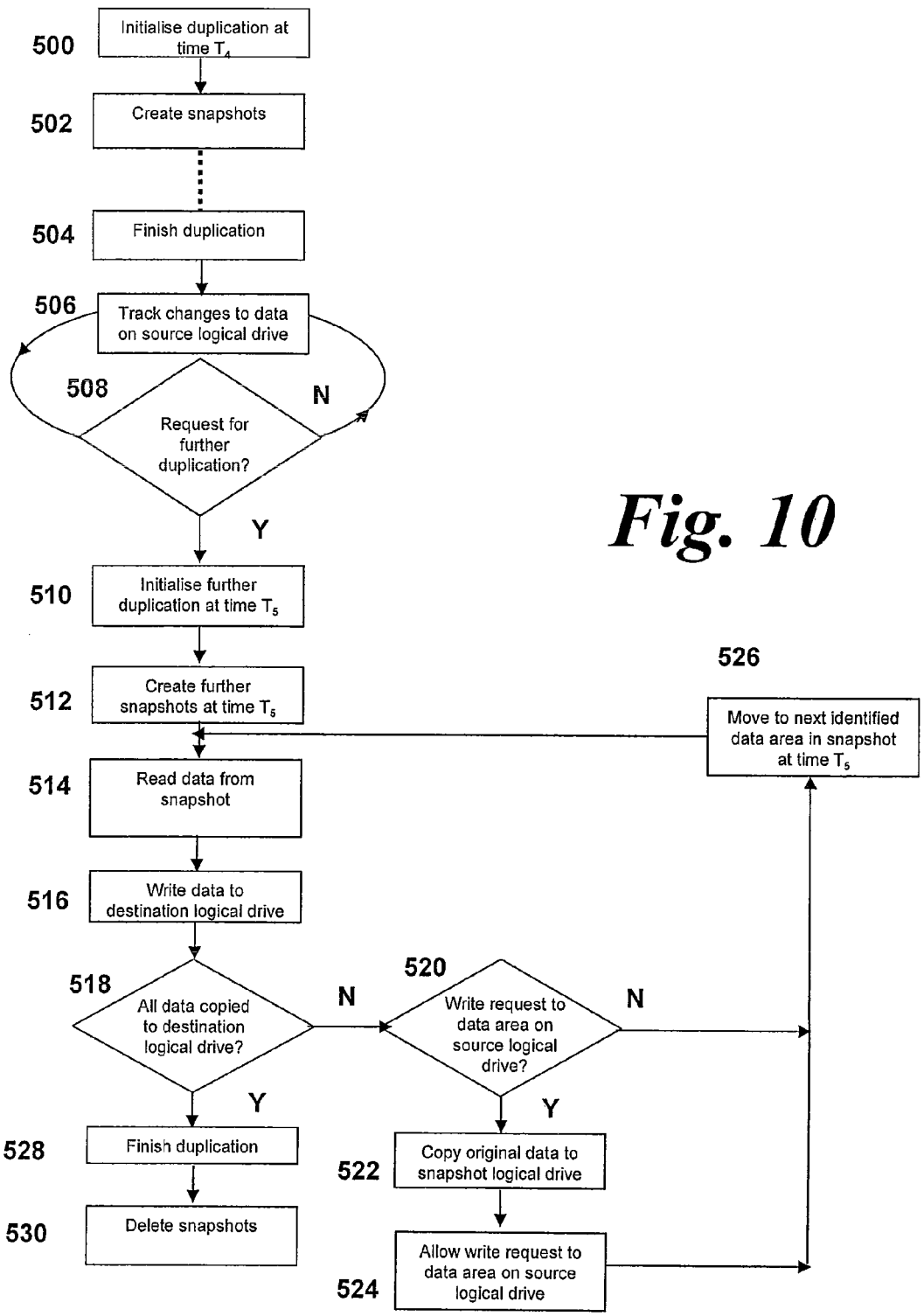
FIG. 10 is a flow diagram illustrating a duplication and resynchronisation method according to a second embodiment of the invention.

A method to enable the destination logical drive 130 to be re-synchronised with the source logical drive 126 according to a second embodiment of the invention is shown in FIG. 10.

Step 500: Initialise Duplication

At step 500, the duplication is initialised at a time $T_4$. In other words, the duplication is started. When the duplication is complete, the destination logical drive 130 will comprise a copy of the source logical drive 126 at time $T_4$ when the duplication process was started. This step is, in essence, identical to step 200 described previously and, for reasons of conciseness, will not be described further here.

Step 502: Create Snapshot Images

At step 502, a snapshot 400 of the source logical drive 126 is created by a snapshot engine. The snapshot 400 is a point in time representation of the source logical drive 126 at the moment the duplication process is initialised, i.e. at time $T_4$. As discussed, previously, this enables any changes to the original data on the source logical drive 126 to be monitored and logged so that the destination logical drive 130 can hold an exact duplication of the source logical drive 126 when the duplication operation has completed. When the snapshot 400 is created, 110 accesses to the source logical drive 126 may have to be temporarily frozen; however, the creation of the snapshot 400 is extremely fast and so any accessing applications will not be frozen for a significant period of time. The snapshot 404 stores both metadata and data relating to the original copy data which has changed since time $T_4$.

Additionally, a further snapshot 148 404 is taken at time $T_4$. As described above, the snapshot 404 comprises only metadata and does not store any copy on write data as is the case for snapshot 400.

The duplication method then proceeds in the manner shown in FIG. 5 along steps equivalent to steps 204 to 218. These steps of the duplication procedure have already been described and, for conciseness, will not be described again here. However, the method of the second embodiment can be considered to comprise steps equivalent to steps 204-218.

Step 504: Finish Duplication

After steps equivalent to steps 202 to 218 have been carried out, the destination logical drive 130 will be an exact copy of the source logical drive 126 at time $T_4$. In contrast to the first embodiment, at this point the snapshot 500 (comprising both metadata and data), having updated the destination logical drive 130 with its contents, is no longer required and can be deleted. The snapshot 404 taken at time $T_4$ comprising only metadata remains. The method now proceeds to step 506.

Step 506: Track Changes to Data On Source Logical Drive

By keeping the snapshot 404 running after the duplication operation has finished, a record can be kept of any changes made to the data on the source logical drive 126 since time $T_4$ (i.e. the time at which the earlier duplication operation was started). The changes to the data may comprise write requests which overwrite data previously stored at a particular data area, deletions, or newly-added data. For each incoming write request addressed to a data area on the source logical drive 126, metadata 408 (see FIG. 9) relating to the changed data at that particular data area will be stored in the snapshot 404.

Since the snapshot 404 only records metadata 408 relating to the data which has changed, then the snapshot 404 will neither take up excessive storage space nor be resource-intensive to update.

Step 508: Request for Further Duplication?

At step 508, it is determined whether a request for a further duplication has been received. This may be specified by a user, or may be predetermined to occur automatically a set interval.

If no duplication is required, then the method proceeds back to step 506 and continues to track the changes made to the source logical drive 126.

If a further duplication is required to bring the destination logical drive back into synchronisation with the source logical drive 126, then the method proceeds to step 510.

Step 510: Initialise Further Duplication

In step 510, a further duplication is initialised at a time $T_5$ which is later than time $T_1$. In other words, the further duplication (or "resynchronisation") is started at time $T_5$. When the further duplication is complete, the destination logical drive 130 will comprise a copy of the source logical drive 126 at time $T_5$ when the further duplication process was started.

This step may simply be a reference point identifying when the duplication was started, and need not require any actions to be carried out. Alternatively, additional steps may be carried out as appropriate prior to copying of data from the source logical drive 126; for example, logging the time at which the duplication was started or initialising required programs. The skilled person will be readily aware that this step could be implemented in a variety of suitable approaches and arrangements.

The method proceeds to step 512.

Step 512: Create Further Snapshot 148s

Two further snapshot 148s are taken at time $T_5$ when the further duplication or resynchronisation is initialised. A snapshot 402 is created which stores both metadata and copy on write data. The snapshot 402 ensures that any writes issued to the source logical drive 126 during the duplication process do not affect the copy of the data copied to the destination logical drive 130 and that the destination logical drive 130 comprises, at the end of the copy process, an identical copy of the source logical drive 126 at time $T_5$.

Another snapshot 406 is created which stores only metadata relating to data which has changed since time $T_5$.

Step 514: Read Data From Resynchronisation Snapshot

At step 514 the data from the snapshot 402 is read. This is the first part of the copy process—the read data is then written to the destination logical drive 130 in step 516 to complete the copy process.

However, there is no need to copy data from the source logical drive 126 which has not changed since the earlier duplication process occurred at time $T_4$. Therefore, the copy engine refers to the snapshot 404 (which has been running since time $T_4$) to indicate which data areas or blocks have been changed since the previous duplication at time $T_4$.

In other words, the snapshot 404 contains metadata referring to only the data areas on the source logical drive 126 which have been modified, changed, written to, deleted or added to between times $T_4$ and $T_5$.

The snapshot 402 enables the data configuration on the source logical drive 126 to be effectively "frozen" at time $T_5$.

Therefore, the snapshot 402 does not comprise any data corresponding to activity occurring on the source logical drive 126 after time $T_5$. Any incoming writes to the source logical drive 126 will be subject to a copy on write operation, i.e. the original data at the write-requested data area will be copied to the resynchronisation snapshot data area prior to the write being allowed.

Step 516: Write Data to Destination Logical Drive

At step 516, the data read in step 514 is copied to the destination logical drive 130. The data written to the destination logical drive 130 is data which has changed in between times $T_4$ and $T_5$. The written data area on the destination logical drive 130 now corresponds to that on the source logical drive 126 at time $T_5$. The method then proceeds to step 518.

Step 518: All Data Copied to Destination Logical Drive?

Throughout the resynchronisation process, it is determined whether all of the data on the source logical drive 126 which has changed between times $T_4$ and $T_5$ has been copied to the destination logical drive 130. If the determination is positive, then the method proceeds to step 528. If, however, it is determined that, with reference to the snapshot 404, there is still data to be copied from the source logical drive 126 to the destination logical drive 130, then the method proceeds to step 520.

Step 520: Write Request to Data Area on the Source Logical Drive?

At step 520, similarly to steps 210 and 318 described previously, it is determined whether the host 102 has issued a write request 140 (FIG. 8) to a data on the source logical drive 126 since the resynchronisation process was initiated at time $T_5$ (step 510).

If it determined that a write request 140 to a data area (e.g. a logical block) on the source logical drive 126 is detected, then the method proceeds to step 522. If no write request to the source logical drive 126 is detected, then the method proceeds to step 526.

Step 522: Copy Original Data to Snapshot Logical Drive

If, at step 320 a write request 140 to a data area is detected, then the original data on that particular data area on the source logical drive 126 is copied in a copy operation 142 (FIG. 4) to the snapshot 402 on the snapshot logical drive 132 prior to the write request 140 being allowed. This is known as "copy on write". This preserves the original data in the snapshot data area so that the resynchronisation snapshot is representative of the data on the source logical drive 126 at time $T_2$ when the resynchronisation operation is initiated. The method then proceeds to step 524.

Step 524: Allow Write Request to Data Area On Source Logical Drive

Once the original data in the write-requested data area (e.g. a particular logical block) has been copied to the snapshot logical drive 132, then that particular data area is now recorded safely and the write request 140 to that particular data area can be allowed.

The method then proceeds to step 526.

Step 526: Move to Next Identified Data Area in Snapshot at Time $T_5$

At step 526, the resynchronisation process proceeds. In this example, at step 526 the resynchronisation process moves to the next data area to be copied as specified by the snapshot 402 which comprises a record of which data areas have been changed or modified between times $T_4$ and $T_5$.

The method then proceeds back to step 514 wherein the identified data is read and then, at step 516, written to the destination logical drive 130 to complete the copy process for that particular data area.

This process continues until it is determined at step 518 that all data areas which have been changed between times $T_4$ and $T_5$ have been copied from the source logical drive 126 to the destination logical drive 130.

Step 528: Finish Duplication

At step 528, the destination logical drive 130 now contains an exact copy of the data on the source logical drive 126 at time $T_5$, i.e. the moment the resynchronisation process was initialised at step 510. The method then proceeds to step 530.

Step 530: Delete Snapshots

Once the duplication has completed, there is no longer any need to keep the snapshot 404 which specifies changes made between times $T_4$ and $T_5$, and so the snapshot 404 can be deleted. This is because the snapshot 406 can provide a complete record of changes made to the data on the source logical drive 126 after time $T_5$. At this time, the snapshot 402 is no longer required and this can be deleted also.

Should a further resynchronisation of the destination logical drive 130 to the source logical drive 126 be required at a later time (i.e. later than time $T_5$) then a further resynchronisation snapshot can be taken at a time $T_6$ and the earlier snapshot 406 (taken at time $T_5$) can be used to direct the copy process to the data areas which have changed in between times $T_5$ and $T_6$.

Variations of the above embodiments will be apparent to the skilled person. The precise configuration of hardware and software components may differ and still fall within the scope of the present invention.

For example, whilst the above examples have been shown and described with reference to a RAID arrangement, this need not be so. Any suitable arrangement of physical drives or logical drive managers could be used. For example, a single physical drive could be represented by a single logical drive.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method of resynchronising a previous duplication, started at a first time, of a source logical drive on a destination logical drive, the method comprising:
   providing first and second snapshots taken at said first time, said first snapshot comprising data and metadata relating to data which has changed since said first time and said second snapshot comprising only metadata relating to data which has changed since said first time;
   subsequent to said previous duplication, deleting said first snapshot;
   tracking, using said second snapshot, changes made to the data on said source logical drive since said first time;
   starting a resynchronisation operation at a second time later than said first time;
   creating a third snapshot at said second time, said third snapshot being arranged to comprise data and metadata relating to data which has changed since said second time;
   utilising said second and third snapshots, copying only data which has changed in between said first and second times from said source logical drive to said destination logical drive.

2. A method according to claim 1, further comprising creating a fourth snapshot at said second time, said fourth snapshot being arranged to comprise only metadata relating to data which has changed since said second time.

3. Apparatus for resynchronising a previous duplication, started at a first time, of a source logical drive on a destination logical drive, the apparatus comprising a controller operable: to provide first and second snapshots taken at said first time, said first snapshot comprising data and metadata relating to data which has changed since said first time and said second snapshot comprising only metadata relating to data which has changed since said first time; to delete, subsequent to said previous duplication, said first snapshot;

to track, using said second snapshot, changes made to the data on said source logical drive since said first time; to start a resynchronisation operation at a second time later than said first time; to create a third snapshot at said second time, said third snapshot being arranged to comprise data and metadata relating to data which has changed since said second time; to utilise said second and third snapshots in order to copy, from said source logical drive to said destination logical drive, only data which has changed in between said first and second times.

4. Apparatus according to claim 3, further operable to create a fourth snapshot at said second time, said fourth snapshot being arranged to comprise only metadata relating to data which has changed since said second time.

* * * * *